（12）United States Patent
Nakanishi et al.

(10) Patent No.: US 11,338,208 B2
(45) Date of Patent: May 24, 2022

(54) INFORMATION PROCESSING PROGRAM, INFORMATION PROCESSING SERVER, AND INFORMATION PROCESSING SYSTEM

(71) Applicant: CYGAMES, INC., Tokyo (JP)

(72) Inventors: Eiji Nakanishi, Tokyo (JP); Yu Hinai, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/936,864

(22) Filed: Jul. 23, 2020

(65) Prior Publication Data

US 2020/0353364 A1   Nov. 12, 2020

Related U.S. Application Data

(63) Continuation of application No. PCT/JP2019/002343, filed on Jan. 24, 2019.

(30) Foreign Application Priority Data

Jan. 24, 2018 (JP) .............................. JP2018-009874

(51) Int. Cl.
*A63F 13/795* (2014.01)
*A63F 13/69* (2014.01)
*A63F 13/71* (2014.01)
*A63F 13/847* (2014.01)

(52) U.S. Cl.
CPC ............ *A63F 13/795* (2014.09); *A63F 13/69* (2014.09); *A63F 13/71* (2014.09); *A63F 13/847* (2014.09)

(58) Field of Classification Search
CPC .............................. A63F 13/795; A63F 13/847
See application file for complete search history.

(56) References Cited

U.S. PATENT DOCUMENTS

| 9,715,789 B1* | 7/2017 | Kane ................... G07F 17/3276 |
| 10,232,269 B1* | 3/2019 | Harrington ........... A63F 13/847 |
| 2007/0207860 A1* | 9/2007 | Yamauchi ............... H04L 67/38 463/42 |

(Continued)

FOREIGN PATENT DOCUMENTS

JP   2017-209331 A   11/2017

*Primary Examiner* — Jay Trent Liddle
(74) *Attorney, Agent, or Firm* — Osha Bergman Watanabe & Burton LLP

(57) ABSTRACT

Provided is an information processing program for causing a computer to realize: a joint-event generation management unit that consumes a first parameter and generates a joint event; a number-of-players determination unit that determines an upper-limit number of players allowed to participate in the joint event; a joint-event participation management unit that consumes a second parameter and that permits other players to participate in the joint event; a privilege management unit that grants an execution privilege for the joint event to a player; a joint-event execution control unit that starts the execution of the joint event when replies have been accepted from all the players except the player who has been granted the execution privilege; a reward providing unit that provides a reward to each player; and a joint-event number-of-times checking unit that checks whether the number of times for execution of the joint event has reached the upper-limit number.

6 Claims, 15 Drawing Sheets

(56) References Cited

U.S. PATENT DOCUMENTS

| | | | | |
|---|---|---|---|---|
| 2012/0157212 A1* | 6/2012 | Kane | ................... | G07F 17/3267 |
| | | | | 463/42 |
| 2012/0252579 A1* | 10/2012 | Sethi | ..................... | A63F 13/847 |
| | | | | 463/40 |
| 2012/0283011 A1* | 11/2012 | Van Luchene | .......... | G07F 17/32 |
| | | | | 463/29 |
| 2014/0011595 A1* | 1/2014 | Muller | .................... | A63F 13/35 |
| | | | | 463/42 |
| 2017/0340977 A1* | 11/2017 | Guthridge | ............. | A63F 13/795 |
| 2018/0264366 A1* | 9/2018 | Kawahara | ............. | A63F 13/798 |

\* cited by examiner

Fig. 4

| NAME OF JOINT EVENT | CONTENT OF EVENT | EXECUTION ORDER | REWARD FOR SUCCESS | ... |
|---|---|---|---|---|
| EVENT 1 | ○○○··· | 1 | STAMINA +100 ITEM X | ... |
| EVENT 2 | △△△··· | 2 | STAMINA +150 ITEM K | ... |
| EVENT 3 | □□□··· | 3 | STAMINA +130 ITEMS U, L | ... |
| ... | ... | ... | ... | ... |

Fig. 5

| NAME OF PLAYER | OWNED STAMINA | OWNED ITEMS | ... |
|---|---|---|---|
| PLAYER 1 | 300 | A, B, C, X | ... |
| PLAYER 2 | 400 | B, E, G | ... |
| PLAYER 3 | 500 | A, B, H, Y | ... |
| ... | ... | ... | ... |

Fig. 6

| NAME OF PLAYER | EXECUTION PRIVILEGE |
|---|---|
| PLAYER 1 | O |
| PLAYER 2 | - |
| PLAYER 3 | - |
| ... | ... |
| PLAYER 20 | - |

INFORMATION PROCESSING PROGRAM, INFORMATION PROCESSING SERVER, AND INFORMATION PROCESSING SYSTEM

TECHNICAL FIELD

The present invention relates to information processing programs, information processing servers, and information processing systems.

BACKGROUND ART

Recently, online games that are provided from server devices to portable terminals operated by players via communication networks are popular, and many game titles have been released.

For example, Patent Literature 1 discloses an online game system that allows a plurality of players to jointly participate in the same event.

CITATION LIST

Patent Literature

{PTL 1}
Japanese Unexamined Patent Application, Publication No. 2017-209331

SUMMARY OF INVENTION

Technical Problem

There is a type of existing online game system, such as the one disclosed in Patent Literature 1, in which a certain player consumes some price to generate a joint event in which a plurality of players jointly participate. In such a joint event, it is possible, only at a predetermined probability, to obtain a reward on the occasion of a success in the joint event. Thus, since it is uncertain whether a reward will be obtained and what will be obtained as a reward, it has been the case that players have to repeatedly execute a specific joint event until a desired reward is obtained.

Even in the case where a certain player has generated a joint event by paying something, players (supporters) who participate in the joint event after the joint event is generated can participate in the joint event without having to pay. Thus, supporters participating in the joint event without having to pay also have a possibility of obtaining rewards for succeeding in the event, and this is more advantageous for supporters participating in an already generated event than a player who has generated the joint event. The situation described above, in which fairness is not maintained between the player who has generated the joint event and the supporters, has suffered the risk of being a factor that diminishes the motivation of the player to participate in the game or to continue the game, as well as the fun and essence of the game as a whole.

Accordingly, some aspects of the present invention have been made in view of the situation described above, and it is an object thereof to provide an information processing program, and information processing server, and an information processing system that provide a game with which the motivations for players to participate in the game and to continue the game can be enhanced by ensuring fairness among the players.

Solution to Problem

An information processing program according to an aspect of the present invention causes a computer to realize: a joint-event generation management unit that, upon accepting a first control signal for generating a joint event in which a plurality of players jointly participate from a terminal of a first player among the plurality of players, the first control signal including an upper-limit number of times that the joint event can be executed successively, consumes a first parameter associated with the first player and generates the joint event, while considering the first player as a participant, in the case where it is determined on the basis of the first parameter that it is possible to generate the joint event; a number-of-players determination unit that determines, on the basis of the upper-limit number of times, an upper-limit number of players allowed to participate in the joint event; a joint-event participation management unit that, upon accepting a request for wishing to participate in the joint event from a terminal of a player other than the first player, consumes a second parameter associated with the other player and permits the other player to participate in the joint event in the case where it is determined, on the basis of the second parameter and the determined upper-limit number of players, that the other player is allowed to participate in the joint event; a privilege management unit that grants an execution privilege for the joint event to one player among a plurality of players permitted to participate in the joint event; a joint-event execution control unit that, in the case where an execution instruction for the joint event has been accepted from the terminal of the player who has been granted the execution privilege, sends a query as to whether or not to permit the execution of the joint event to all the players except the player who has been granted the execution privilege among the plurality of players permitted to participate in the joint event, and starts the execution of the joint event when replies permitting the execution of the joint event have been accepted from all those players; a reward providing unit that provides a reward to each player participating in the joint event in accordance with the progress status of the joint event; and a joint-event number-of-times checking unit that checks whether or not the number of times for the execution of the joint event has reached the upper-limit number of times each time the joint event is finished.

A "player" refers to a user who operates a terminal device, and is also a concept corresponding to a client in what is called a client-server system. Furthermore, generally, a player may participate in a game via what is called a player character that is engaged in activities, take actions, and so forth in a virtual game space instead of the player himself or herself, or via a suitable game medium associated with the player character.

A "parameter" refers to information relating to the progress of a game, such as stamina indicating the physical strength in the game and items in the game. Parameters are determined in accordance with the content of game play. The parameter that is consumed when participating in a joint event is determined, for example, in accordance with the difficulty and importance of game play. Stamina may be restored as time elapses or by using an item. Examples of the items include various items for enhancing the attacking ability of a player, various items for restoring the physical strength of a player or for recovering from damage, and various items for increasing damage to other players and enemy characters in the game. Furthermore, control may be executed so as to decrease (consume) at least one of stamina and an item when generating an event or participating in an event in the game. The amount of this decrease (consumed amount) may also be determined in accordance with the difficulty and importance of game play. The parameters may also include a currency or the like in the game, as well as the examples given above.

A "reward" refers to something generating an effect that brings about an advantage in proceeding with the game relative to other players or enemy characters in the game in a game event in which a player participates, or something that enhances a value or a sense of value when it is acquired or owned, and the kinds thereof are not particularly limited. Examples of rewards include stamina and various items.

It is to be noted that, in the present invention, a unit does not simply refer to a physical means but also includes the case where the functionality of the "unit" is realized by software. Furthermore, the functionality of one "unit" or device may be realized by two or more physical means or devices, and the functionality of two or more "units" or devices may be realized by a single physical means or device.

Advantageous Effects of Invention

The present invention provides a game with which the motivation of players to participate in the game and to continue the game can be enhanced by ensuring fairness among the players.

BRIEF DESCRIPTION OF DRAWINGS

FIG. 4 shows an example of joint event information according to the embodiment of the present invention.

FIG. 5 shows an example of parameter information according to the embodiment of the present invention.

FIG. 6 shows an example of execution privilege information according to the embodiment of the present invention.

DESCRIPTION OF EMBODIMENTS

An embodiment of the present invention will be described below with reference to the accompanying drawings. The following embodiment is an example for explaining the present invention, and it is not intended to limit the present invention only to this embodiment. Furthermore, the present invention can be modified in various forms not departing from the gist thereof. Furthermore, the same reference signs are attached to the same components throughout the drawings wherever possible, and repeated descriptions will be omitted.

Figure 1:
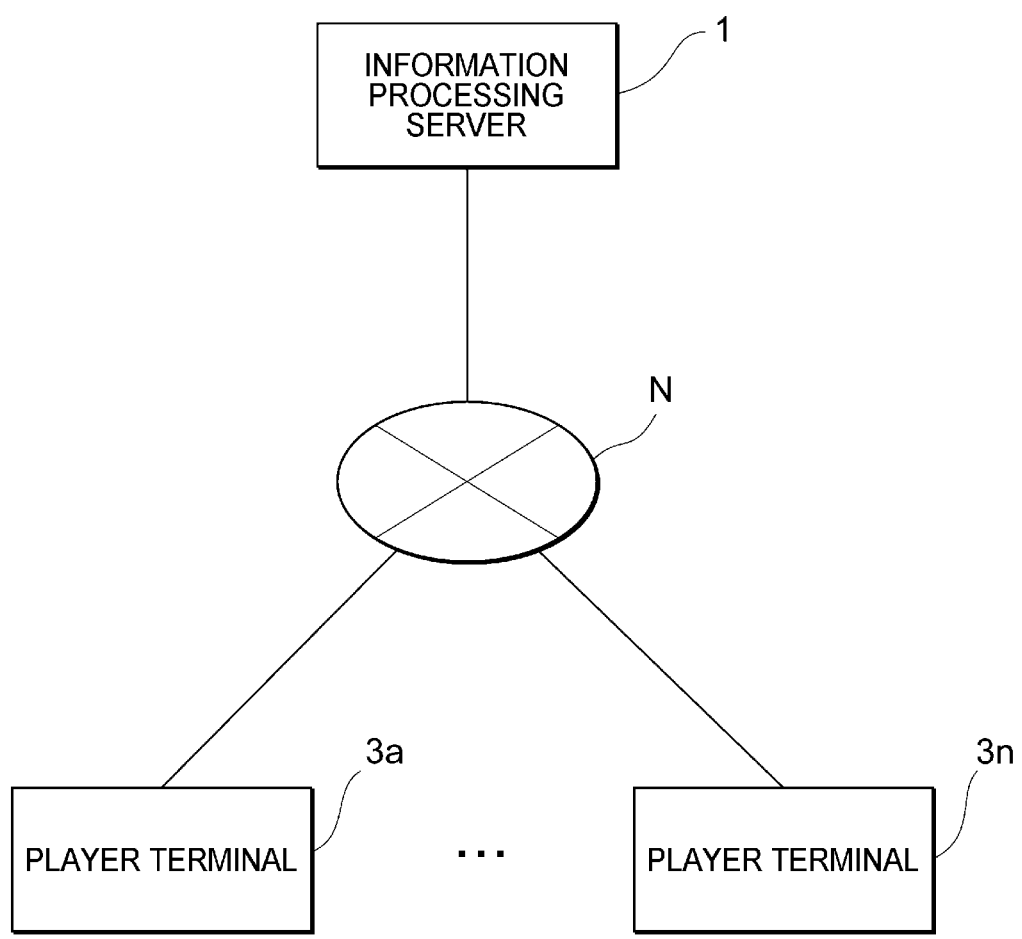
FIG. 1 is a schematic configuration diagram (system configuration diagram) of an information processing system according to an embodiment of the present invention.

FIG. 1 is a block diagram showing the overall configuration of an information processing system 100 according to this embodiment. As shown in FIG. 1, as an example, the information processing system 100 is configured to include an information processing server 1, n (n is an arbitrary integer greater than or equal to 1) player terminals 3, and a network N.

The information processing system 100 is what is called a client-server system. The information processing system 100 is realized by mutually carrying out communication between the n player terminals 3 acting as clients and the information processing server 1 via the network N.

The information processing server 1 is realized, for example, by a server device. Furthermore, the player terminals 3 are realized, for example, by smartphones, game machines, or personal computers. Furthermore, the network N is realized, for example, by the Internet, a network such as a mobile phone network, a LAN (Local Area Network), or a network formed by combining these types of networks.

In the drawings, a player terminal 3a and a player terminal 3n are shown as the n player terminals 3. In the following description, however, these n player terminals 3 will be simply referred to as the "player terminals 3", with the reference signs partially omitted, in the case where no distinction is made thereamong.

Figure 2:
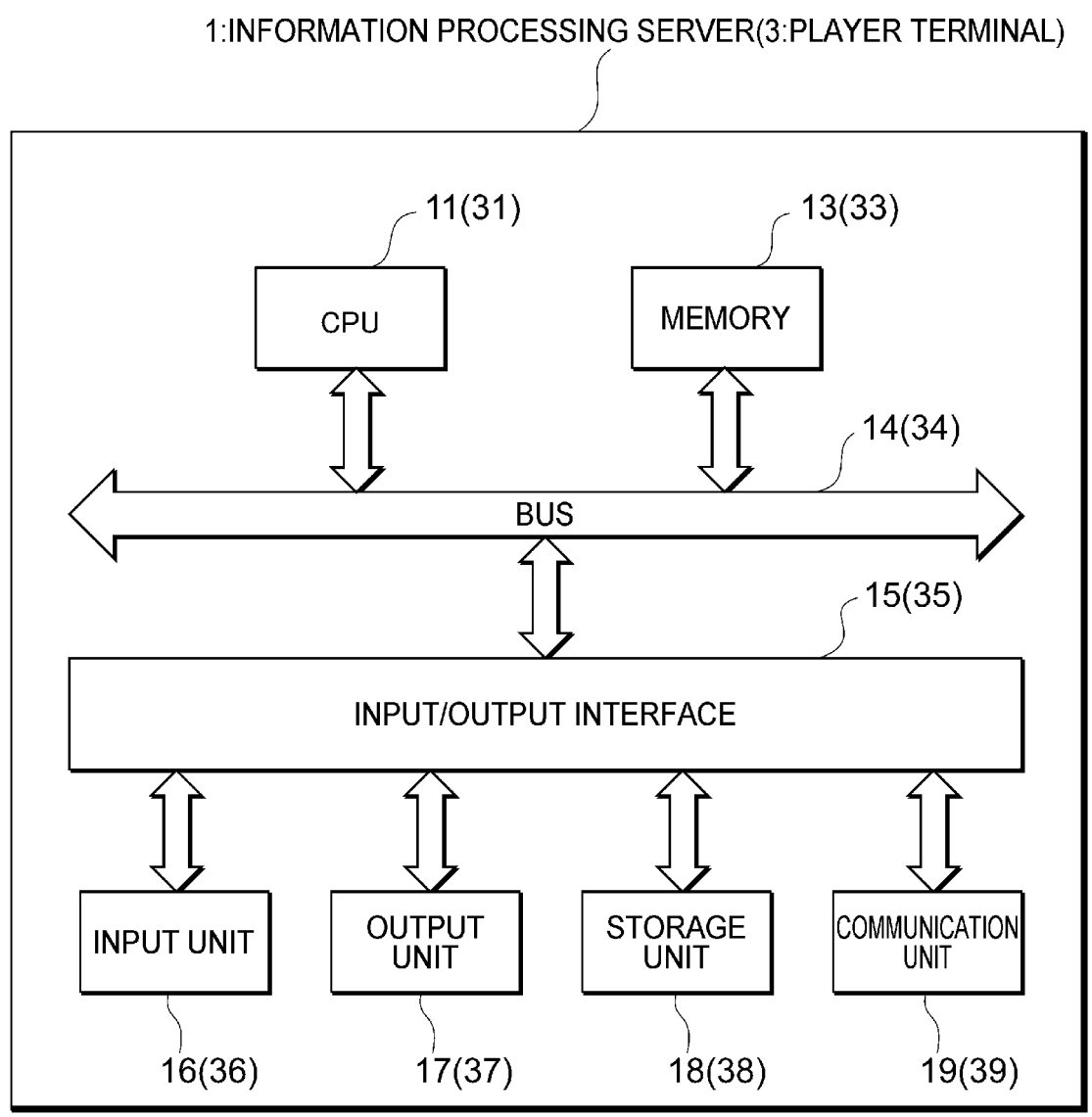
FIG. 2 is a schematic configuration diagram (block diagram) of an information processing server and a player terminal according to the embodiment of the present invention.

FIG. 2 is a block diagram showing the hardware configuration of the information processing server 1 and the hardware configuration of the player terminal 3 according to the embodiment of the present invention. In the figure, reference signs corresponding to the hardware of the information processing server 1 are shown without adding parentheses, and reference signs corresponding to the hardware of the player terminal 3 are shown with added parentheses.

As shown in FIG. 2, as an example, the information processing server 1 includes a CPU (Central Processing Unit) 11, a memory 13 constituted of a ROM (Read Only Memory) 12, a RAM (Random Access Memory), etc., a bus 14, an input/output interface 15, an input unit 16, an output unit 17, a storage unit 18, and a communication unit 19.

The CPU 11 executes various kinds of processing according to programs recorded in the memory 13 or programs loaded from the storage unit 18 into the memory 13.

The memory 13 stores, as appropriate, data, etc. needed for the execution of various kinds of processing by the CPU 11. The CPU 11 and the memory 13 are connected to each other via the bus 14. The input/output interface 15 is also connected to the bus. The input unit 16, the output unit 17, the storage unit 18, and the communication unit 19 are connected to the input/output interface 15.

The input unit 16 is formed of various kinds of buttons, a touchscreen, a microphone, or the like, and accepts input of various kinds of information in accordance with instruction operations performed by the administrator of the information processing server 1 or the like. Alternatively, the input unit 16 may be realized by an input device, such as a keyboard or a mouse, that is independent of a main unit accommodating the other units of the information processing server 1.

The output unit 17 is formed of a display, a speaker, or the like, and outputs image data or music data. The image data or music data output from the output unit 17 is output from the display, the speaker, or the like in a form recognizable by a player, as an image or music.

The storage unit 18 is formed of a semiconductor memory, such as a DRAM (Dynamic Random Access Memory), and stores various kinds of data.

The communication unit 19 realizes communication that is carried out with other devices. For example, the communication unit 19 carries out communication mutually with the player terminals 3 via the network N.

Furthermore, although not shown, a drive is provided, as needed and as appropriate, in the information processing server 1. For example, a removable medium formed of a magnetic disk, an optical disk, a magneto-optical disk, a semiconductor memory, or the like is loaded, as appropriate. The removable medium stores a program for executing a game and various kinds of data, such as image data. The program and the various kinds of data, such as image data, read by the drive from the removable medium, are installed in the storage unit 18, as needed.

Next, the hardware configuration of the player terminal 3 will be described. As shown in FIG. 2, as an example, the player terminal 3 includes a CPU 31, a memory 33, a bus 34, an input/output interface 35, an input unit 36, an output unit 37, a storage unit 38, and a communication unit 39. These units individually have functions equivalent to those of the units having the same names and different reference signs in the information processing server 1 described above. Thus, repeated descriptions will be omitted.

Figure 3:
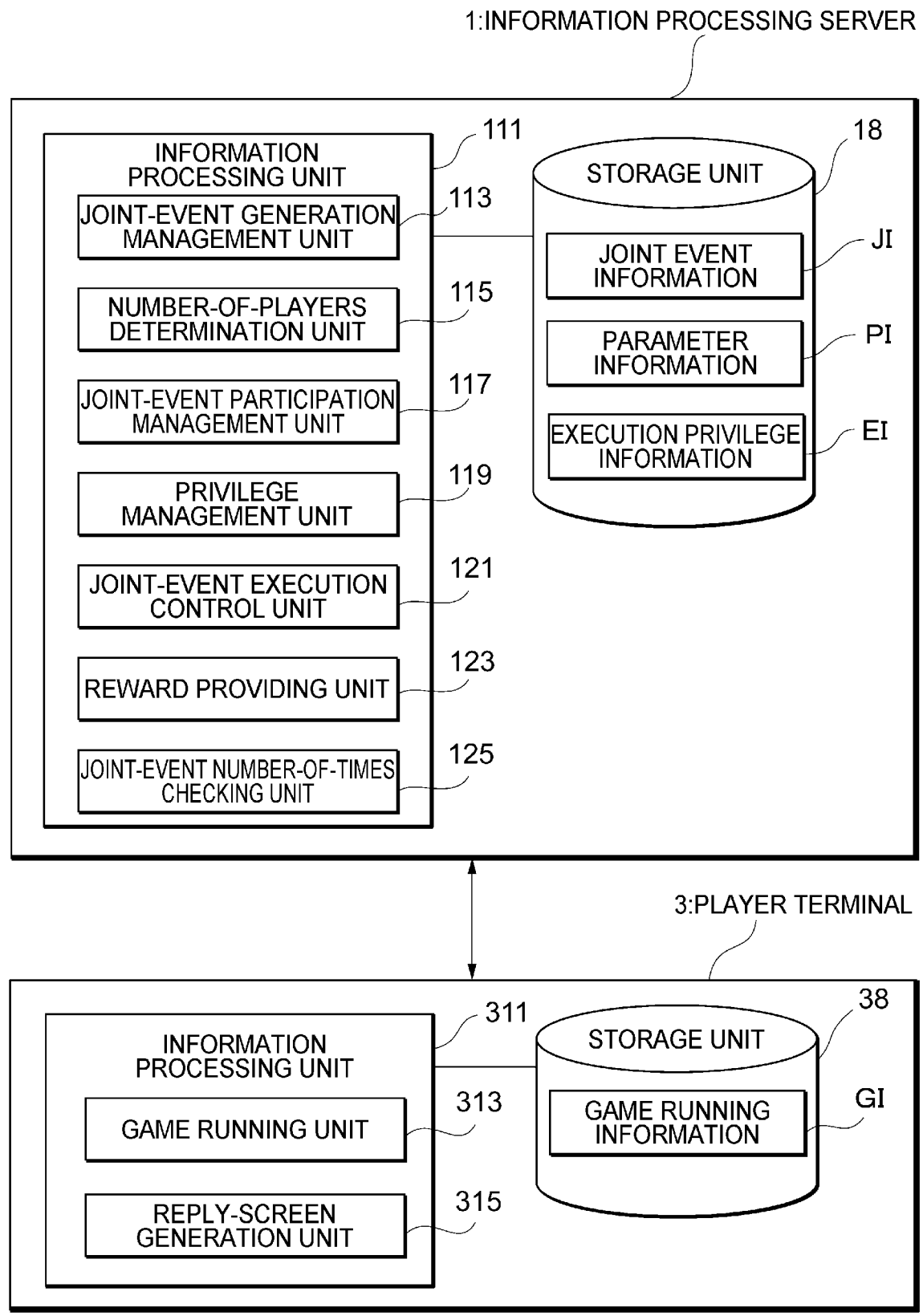
FIG. 3 is a schematic configuration diagram (block diagram) showing an example of the functional configurations of the information processing server and the player terminal according to the embodiment of the present invention.

FIG. 3 is a block diagram showing an example of the functional configuration of the information processing server 1 and the functional configuration of the player terminal 3 according to the embodiment of the present invention. As shown in FIG. 3, as an example, the information processing server 1 is configured to include an information processing unit 111 that executes a joint-event management process for managing the generation, execution, etc. of a joint event in a game and the storage unit 18 that records information needed for the joint-event management process and information generated through the joint-event management process.

The information processing unit 111 is functionally configured to include, for example, a joint-event generation management unit 113, a number-of-players determination unit 115, a joint-event participation management unit 117, a privilege management unit 119, a joint-event execution control unit 121, a reward providing unit 123, and a joint-event number-of-times checking unit 125. These units of the information processing unit 111 can be realized, for example, by the CPU 11 executing programs stored in the memory 113 or the storage unit 18 shown in FIG. 2.

The joint-event generation management unit 113 manages the generation of a joint event, in which a plurality of players jointly participate. Specifically, the joint-event generation management unit 113 accepts a joint-event generation signal (first control signal) for generating a joint event from the player terminal 3 (terminal) of a first player among a plurality of players, including an upper-limit number of times for which successive execution is allowed. Then, the joint-event generation management unit 113 determines whether it is possible to generate a joint event on the basis of the accepted joint-event generation signal as well as at least one of stamina and an item (first parameter) associated with the first player. In the case where it is determined that it is possible to generate a joint event, the joint-event generation management unit 113 consumes the first parameter and generates a joint event, considering the first player as a participant. Alternatively, the joint event may be generated in consideration of the progress status of the game, conditions preset by the player, etc.

The number-of-players determining unit 115 determines an upper-limit number of players allowed to participate in the joint event on the basis of the upper-limit number of times.

The joint-event participation management unit 117 manages participation in the joint event. Specifically, the joint-event participation management unit 117 accepts a request for wishing to participate in the joint event from the player terminal 3 (terminals) of a player other than the first player. Then, in accordance with the request, the joint-event participation management unit 117 determines whether the other player is allowed to participate in the joint event on the basis of at least one of stamina and items (second parameter) associated with the other player, as well as the determined upper-limit number of players. In the case where it is determined that the other player is allowed to participate, the joint-event participation management unit 117 consumes the second parameter and permits the other player to participate in the joint event.

The privilege management unit 119 grants an execution privilege for the joint event to one player among a plurality of players permitted to participate in the joint event.

The joint-event execution control unit 121 controls the execution of the joint event. Specifically, the joint-event execution control unit 121 accepts an execution instruction for the joint event from the player terminal 3 (terminal) of the player to which the execution privilege has been granted by the privilege management unit 119. Then, the joint-event execution control unit 121 sends a query as to whether or not to permit the execution of the joint event to all the players except the player to which the execution privilege has been granted among the plurality of players allowed to participate in the joint event. Upon accepting replies permitting the execution of the joint event from all those players, the joint-event execution control unit 121 starts the execution of the joint event.

The reward providing unit 123 provides a reward to each of the players participating in the joint event in accordance with the progress status of the joint event.

The joint-event number-of-times checking unit 125 checks whether or not the number of times for execution of the joint event has reached the upper-limit number of times each time the joint event is finished.

The storage unit 18 stores joint event information JI, parameter information PI, and execution privilege information EI.

FIG. 4 shows an example of the joint event information according to the embodiment of the present invention. As shown in FIG. 4, for example, the storage unit 18 stores information relating to a large number of joint events that may be generated, such as the names of joint events, the contents of the events, execution orders, and rewards for successes (e.g., rewards that are provided for successes in the joint events), in association with each other. For example, the joint-event generation management unit 113 shown in FIG. 3 extracts (generates) joint events 1 to 20 that can be executed successively from the stored joint-event information JI in accordance with the upper-limit number of times (e.g., 20 times) that joint events can be executed successively.

FIG. 5 shows an example of the parameter information PI according to the embodiment of the present invention. As shown in FIG. 5, as the parameter information PI, for example, the storage unit 18 stores, for each player, the stamina owned by the player, the items possessed by the player, etc. in association with each other.

FIG. 6 shows an example of the execution privilege information EI according to the embodiment of the present invention. As shown in FIG. 6, as the execution privilege information, for example, the storage unit 18 stores information indicating the player to which the execution privilege for a joint event has been granted among players 1 to 20 based on the number of players (e.g., 20) determined by the number-of-players determination unit 115 shown in FIG. 3. Although the execution privilege is granted to player 1 in the example in FIG. 6, the execution privilege information EI is updated each time the player to which the execution privilege is granted is changed.

Referring back to FIG. 3, as an example, the player terminal 3 is configured to include an information processing unit that manages the progress of game play and the storage unit 38 that stores information needed for the progress of the game.

The information processing unit 311 is functionally configured to include, for example, a game running unit 313 and a reply-screen generation unit 315. These units of the information processing unit 311 can be realized by the CPU 31 executing programs stored in the memory 33 or the storage unit 38 shown in FIG. 2.

The game running unit 313 executes processing for running the game. The game running unit 313 runs the game on the basis of game software included in game running information GI stored in the storage unit 38 and the contents of player operations input from the input unit 36 shown in FIG. 2.

As the game is run, the game running unit 313 executes control processing for generating game images from image data included in the game running information GI and outputting the generated images to the output unit 37. Similarly, as the game is run, the game running unit 313 executes control processing for generating game music and audio from music data and audio data included in the game running information GI and outputting the generated music and audio from the output unit 37.

As described earlier, predetermined parameters (parameter information PI) in the game run by the game running unit 313 are managed by the information processing server 1. For example, parameters such as stamina in the game and game items in the game are managed by the information processing server 1. Thus, in the case where processing involving changes in these predetermined parameters (i.e., processing involving increases or decreases in the values of the parameters) occurs in the game, the game running unit 313 carries out communication with the information processing server 1 to update the parameters managed by the information processing server 1. Then, the game running unit 313 receives the updated parameters from the information processing server 1 and continues to run the game in accordance with the updated parameters.

The reply-screen generation unit 315 generates a reply screen (e.g., FIGS. 12, 14, and 15, which will be described later) for accepting replies to various queries from the information processing server 1. Alternatively, the reply-screen generation unit 315 may generate various screens that are output to the output unit 37 of the player terminal 3 shown in FIG. 2, as well as the reply screens.

(Joint-Event Management Process)

Figure 7:
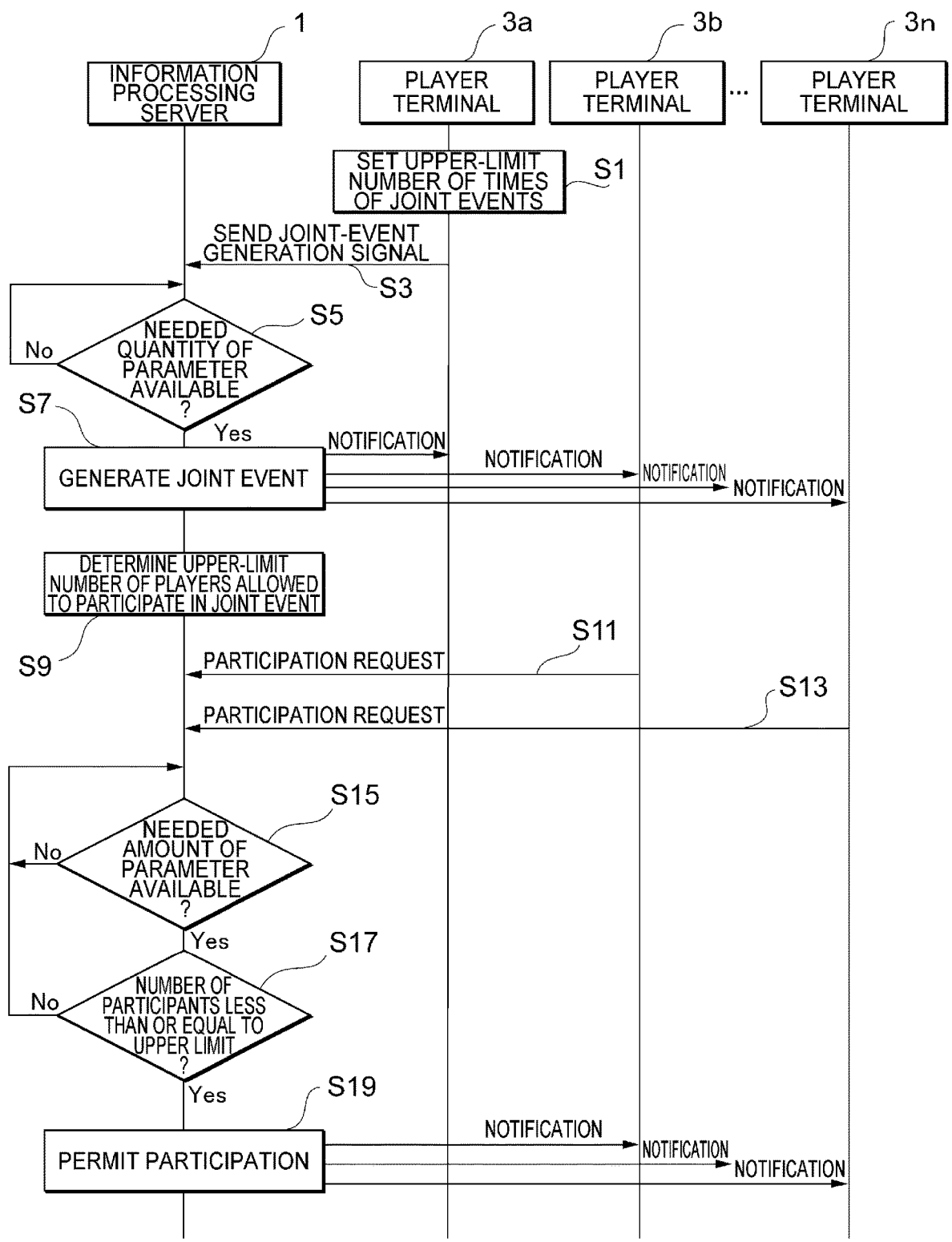
FIG. 7 is a flowchart showing an example of a joint-event management process according to the embodiment of the present invention.
Figure 8:
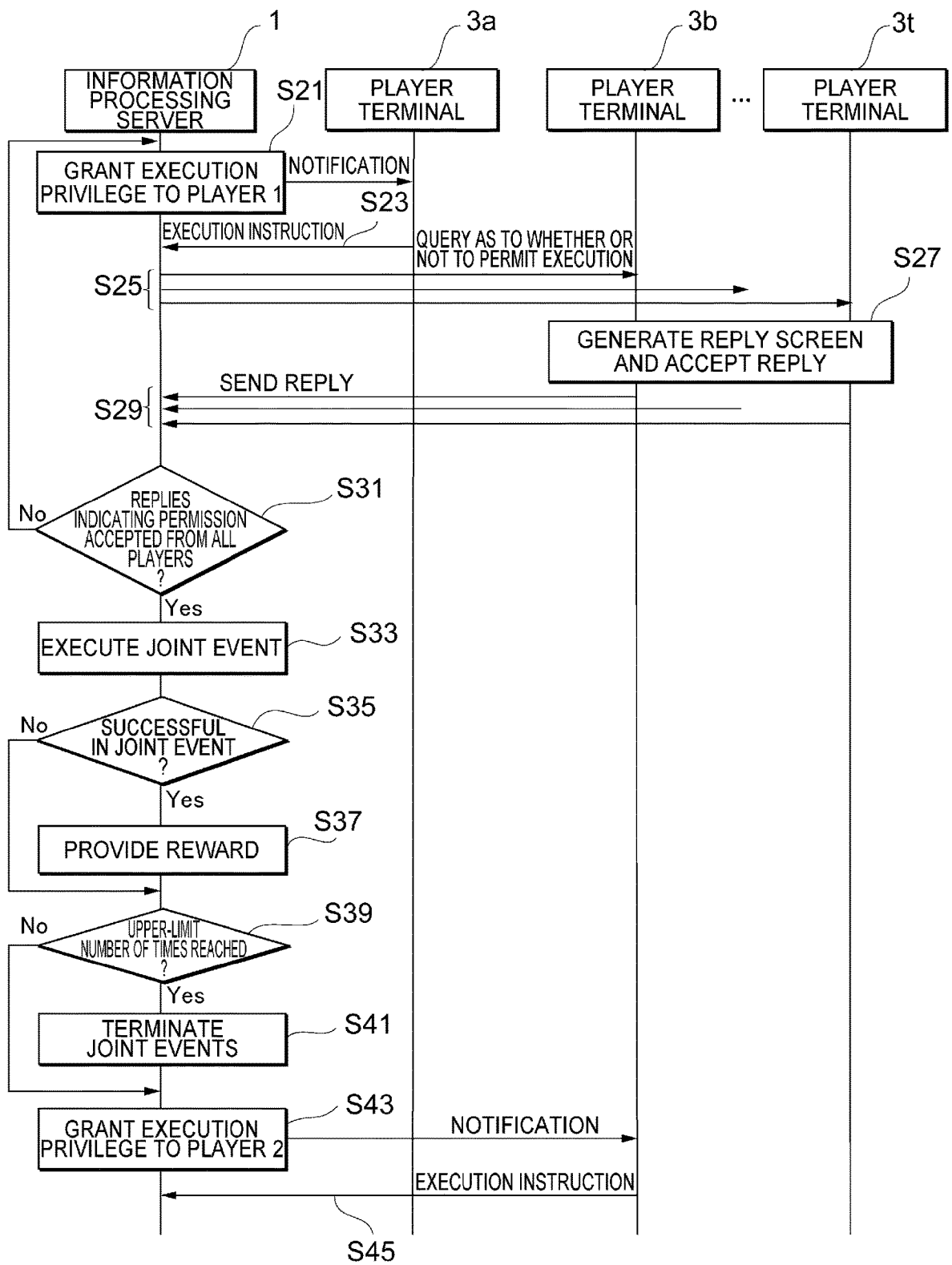
FIG. 8 is a flowchart showing an example of a joint-event management process according to the embodiment of the present invention.

The joint-event management process according to the embodiment of the present invention will be described with reference to FIGS. 7 to 15. FIGS. 7 and 8 are flowcharts showing an example of the joint-event management process according to the embodiment of the present invention. The flowcharts shown in FIGS. 7 and 8 are not separate, and the processing flow shown in FIG. 8 continues from the processing flow shown in FIG. 7.

(Step S1 in FIG. 7)

The output unit 37 of the player terminal 3*a* of player 1, shown in FIG. 2, outputs a number-of-times setting screen G1 for setting an upper-limit number of times that a joint event in which a plurality of players jointly participate can be executed successively.

Figure 9:
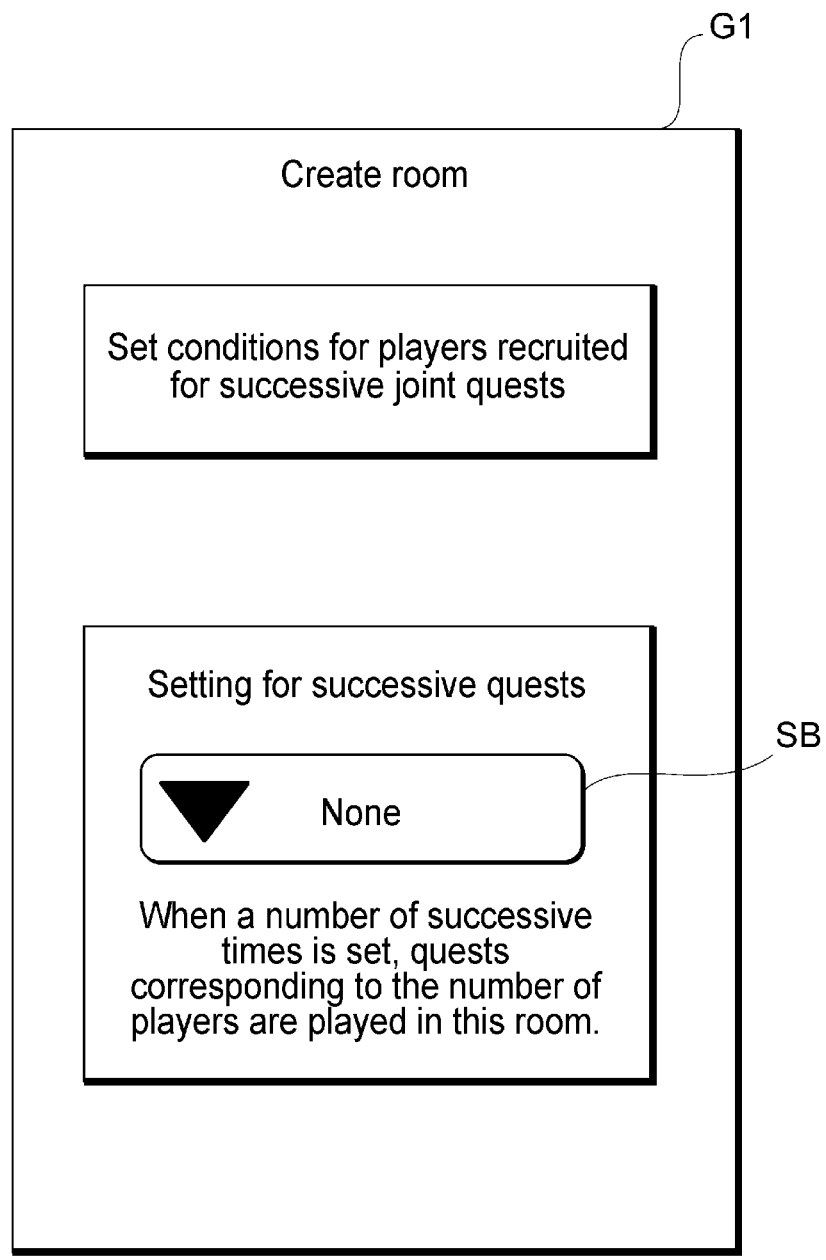
FIG. 9 shows an example of the screen of the output unit of the player terminal according to the embodiment of the present invention.
Figure 10:
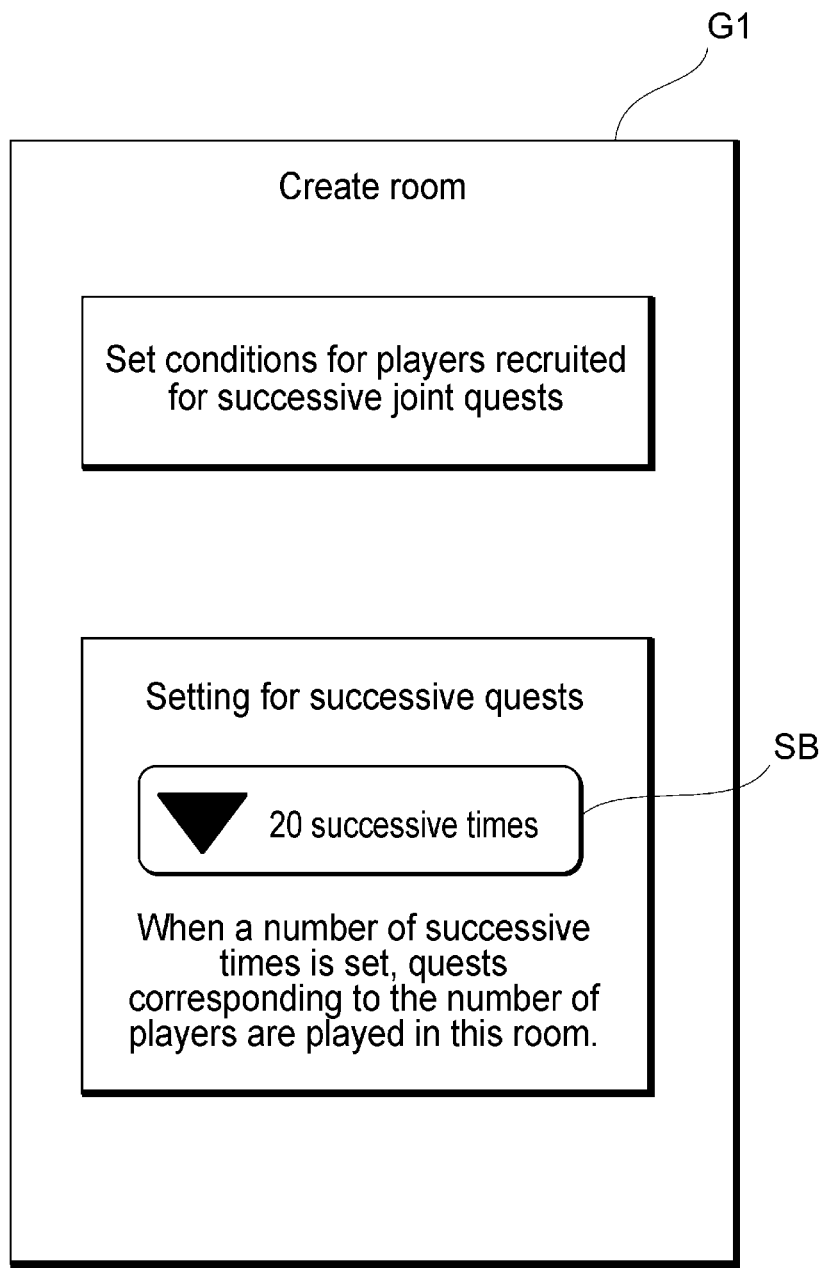
FIG. 10 shows an example of the screen of the output unit of the player terminal according to the embodiment of the present invention.

FIG. 9 is an example of the screen before an upper-limit number of times is set in the number-of-times setting screen G1, and FIG. 10 is an example of the screen after an upper-limit number of times is set in the number-of-times setting screen G1. When player 1 presses a setting button SB on the number-of-times setting screen G1, for example, a selection screen (not shown) that allows selection of one of 1 to 30 as a number of successive times is output so as to be superimposed on the number-of-times setting screen G1 or instead of the number-of-times setting screen G1. Then, when player 1 selects 20 as the number of successive times, for example, "20 successive times" (upper-limit number of times) is output on the setting button SB, as shown in FIG. 10.

(Step S3)

The communication unit 39 of the player terminal 3*a*, shown in FIG. 2, sends a joint-event generation signal (first control signal) for generating a joint event, including the upper-limit number of times, to the information processing server 1.

(Step S5)

Upon accepting the joint-event generation signal from the player terminal 3 (terminal) of player 1 (first player), the joint-event generation management unit 113 of the information processing server 1, shown in FIG. 3, reads stamina information (first parameter) associated with player 1 from the parameter information PI recorded in the storage unit 18 shown in FIGS. 3 and 5, and determines whether or not the first parameter has a needed quantity. For example, in the case where the stamina needed to generate a joint event is "50" (needed quantity), the joint-event generation management unit 113 compares the owned stamina "300" associated with player 1, shown in FIG. 5, with the needed quantity "50" to determine that player 1 has the needed quantity of stamina, and thus determines that it is possible to generate the joint event.

Upon accepting the joint-event generation signal, the joint-event generation management unit 113 may read the item information (first parameter) associated with player 1 from the parameter information recorded in the storage unit 18 shown in FIGS. 3 and 5, and may determine whether player 1 owns a needed item. For example, in the case where the item needed to generate a joint event is "B", the joint-event generation management unit 113 compares the owned items "A, B, C, X" associated with player 1, shown in FIG. 5, with the needed item "B" to determine that player 1 owns the item "B", and thus determines that it is possible to generate the joint event.

The joint-event generation management unit 113 may generate a joint event only in the case where the conditions for both stamina information and item information are satisfied, or may generate a joint event in the case where one of the conditions for stamina information and item information is satisfied. In the case where it is determined that it is possible to generate a joint event (case of Yes), the process proceeds to step S7.

(Step S7)

In the case where it is determined that it is possible to generate a joint event, the joint-event generation management unit 113 consumes the first parameter (e.g., consumes the needed stamina "50" from the owned stamina "300" of player 1 and consumes the needed item "B" from the owned items "A, B, C, X" of player 1), and generates a joint event, considering player 1 as a participant. Then, the joint-event generation management unit 113 notifies the player terminal 3*a* of player 1 that the joint event has been generated. Furthermore, the joint-event generation management unit 113 notifies the player terminal devices of other players, e.g., the player terminal 3*b* of player 2, . . . the player terminal 3*n* of player N, that the joint event has been generated.

(Step S9)

The number-of-players determination unit 115 shown in FIG. 3 determines the upper-limit number of players "20" allowed to participate in the joint event on the basis of the upper-limit number of times "20" set by the player terminal 3*a*.

(Steps S11 and S13)

The player terminals 3*b* . . . 3*n* of players wishing to participate in the joint event, other than player 1, send participation requests for wishing to participate in the joint event.

(Step S15)

Upon receiving the participation requests, for each player who has sent a participation request, similarly to step S5, the joint-event participation management unit 117 determines whether or not to permit participation in the joint event on the basis of at least one of stamina and an item (second parameter) associated with the player who has sent the participation request. The stamina needed for participation in the joint event may be the same as or different from the stamina needed for generation of the joint event. Similarly, the item needed for participation in the joint event may be the same as or different from the item needed for generation of the joint event.

(Step S17)

Next, upon receiving the participation requests, for each player who has sent a participation request, the joint-event participation management unit 117 determines whether or not to permit participation by the player on the basis of the upper-limit number of players determined by the number-of-players determination unit 115 shown in FIG. 3. For example, since the determined upper-limit number of players is "20", the joint-event participation management unit 117 permits participation by a player newly wishing to participate if the number of currently participating players is less than 20.

Note that step S15 and step S17 need not necessarily be executed as described above. For example, the joint-event participation management unit 117 may be configured to skip step S15 even when a player newly wishing to participate appears, not permitting participation by the new player, in the case where the number of players currently participating in the joint event has already reached the upper-limit number of players. In the case where participation in the joint event is allowed in steps S15 and S17 (case of Yes), the process proceeds to step S19.

(Step S19)

In the case where it is determined that participation in the joint event is allowed, the joint-event participation management unit 117 consumes the second parameter and permits the other player to participate in the joint event. Then, the joint-event participation management unit 117 sends a notification to that effect to the player terminals of only players 2 to 20 permitted to participate in the joint event.

(Step S21 in FIG. 8)

The privilege management unit 119 shown in FIG. 3 grants an execution privilege for the joint event to one player among the plurality of players permitted to participate in the joint event. For example, the privilege management unit 119 grants an execution privilege for joint event 1 to player 1 who has generated successive joint events, and notifies the player terminal 3*a* of player 1 to that effect.

(Step S23)

The player terminal 3*a* of player 1, who has been granted the execution privilege for joint event 1 by the privilege management unit 119, sends an execution instruction for joint event 1 to the information processing server 1.

Figure 11:
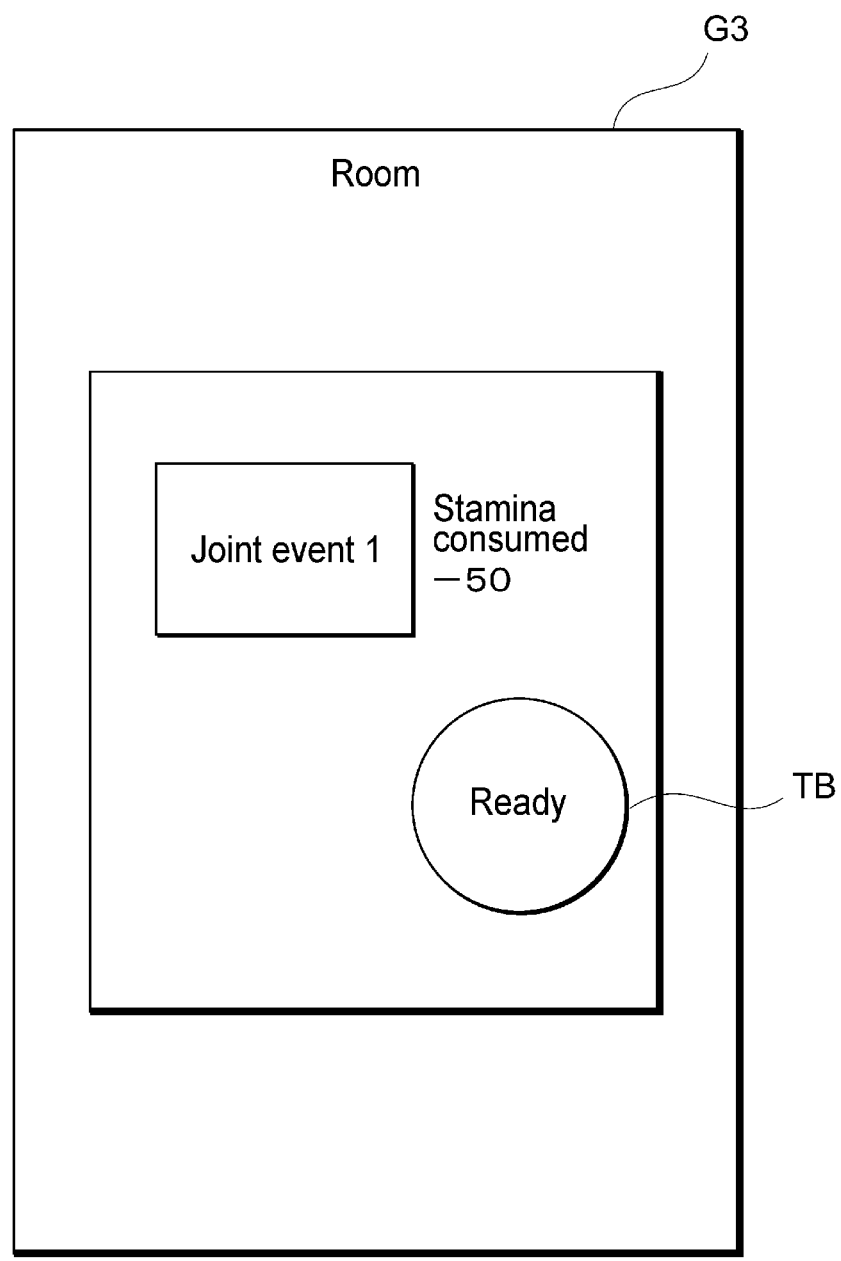
FIG. 11 shows an example of the screen of the output unit of the player terminal according to the embodiment of the present invention.

FIG. 11 shows an example of an execution instruction screen G3 that is output from the output unit 37 of the player terminal 3*a* of player 1, who has been granted the execution privilege for joint event 1. As shown in FIG. 11, when player 1 presses an instruction button TB for instructing the execution of joint event 1 in the execution instruction screen G3, the execution instruction for joint event 1 is sent to the information processing server 1.

(Step S25)

In the case where the execution instruction for joint event 1 is received from the player terminal 3*a* of player 1, the joint-event execution control unit 121 of the information processing server 1, shown in FIG. 3, sends a query as to whether or not to permit the execution of the joint event to the player terminals 3*b* to 3*t* of all the players 2 to 20 except player 1, who has been granted the execution privilege, among the plurality of players 1 to 20 permitted to participate in joint event 1.

(Step S27)

The reply-screen generation unit 315 of each of the player terminals 3*b* to 3*t*, shown in FIG. 3, generates an approval screen (reply screen) for the query from the information processing server 1 as to whether or not to permit execution. Then, the output unit 37 outputs the screen to accept a reply from each of players 2 to 20 via the output unit 37.

Figure 12:
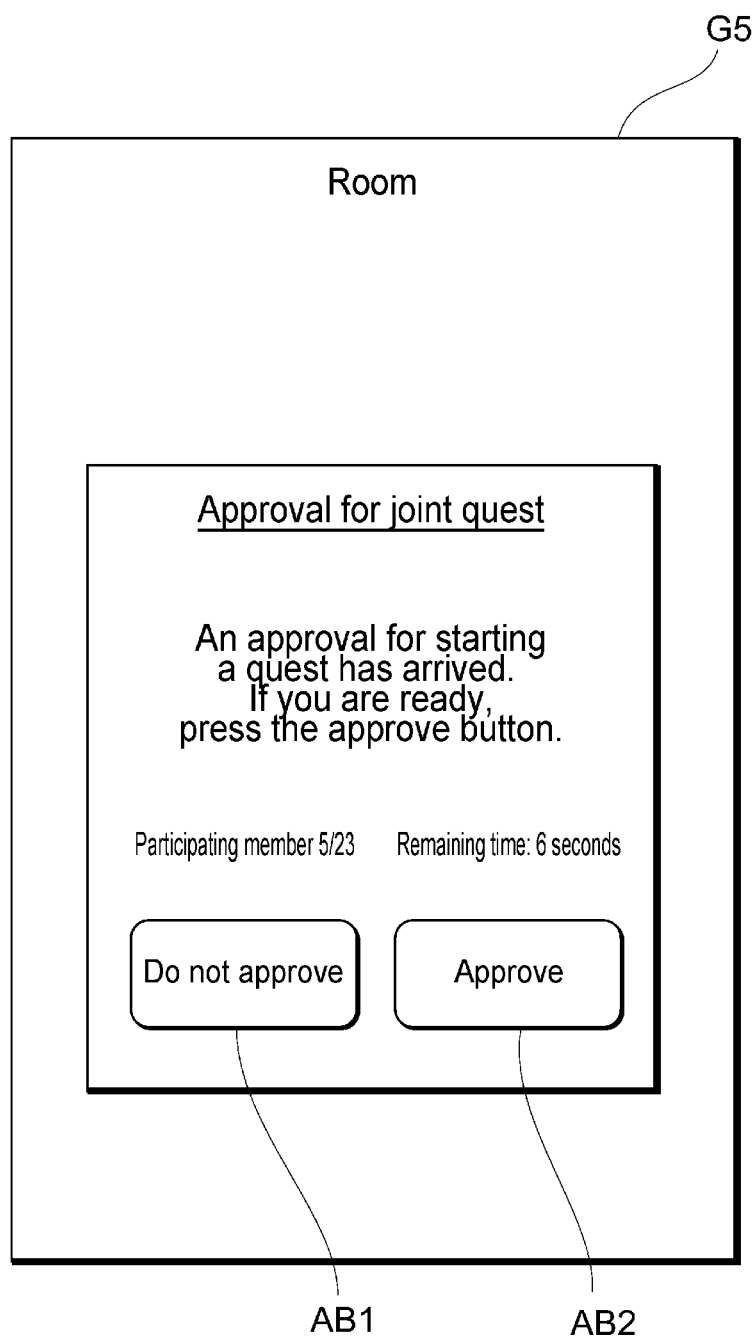
FIG. 12 shows an example of the screen of the output unit of the player terminal according to the embodiment of the present invention.

FIG. 12 shows an example of an approval screen G5 that is output from the output unit 37 of each of the player terminals 3*b* to 3*t* that has received the query as to whether or not to permit the execution of joint event 1. As shown in FIG. 12, when the player presses an approval button AB2 for approving the execution of joint event 1 in the approval screen G5, the execution of joint event 1 is approved. Meanwhile, when the player presses a non-approval button AB1 for not approving the execution of joint event 1 in the approval screen G5, the execution of joint event 1 is not approved.

(Step S29)

The communication unit 39 of each of the player terminals 3*b* to 3*t*, shown in FIG. 2, sends the accepted reply to the information processing server 1. For example, as shown in FIG. 12, when the player presses the approval button AB2 for approving the execution of joint event 1 in the approval screen G5, the execution of joint event 1 is approved, and a reply permitting execution is sent to the information processing server 1. Meanwhile, when the player presses the non-approval button AB1 for not approving the execution of joint event 1 in the approval screen G5, the execution of joint event 1 is not approved. The configuration may be such that, in this case, a reply not permitting execution is sent to the information processing server 1 or no reply is sent to the information processing server 1.

(Steps S31 and S33)

The joint-event execution control unit 121 of the information processing server 1, shown in FIG. 3, determines whether or not replies permitting the execution of joint event 1 have been accepted from all of players 2 to 20. When replies permitting the execution of joint event 1 have been accepted from all of players 2 to 20, the execution of the joint event is started.

Figure 13:
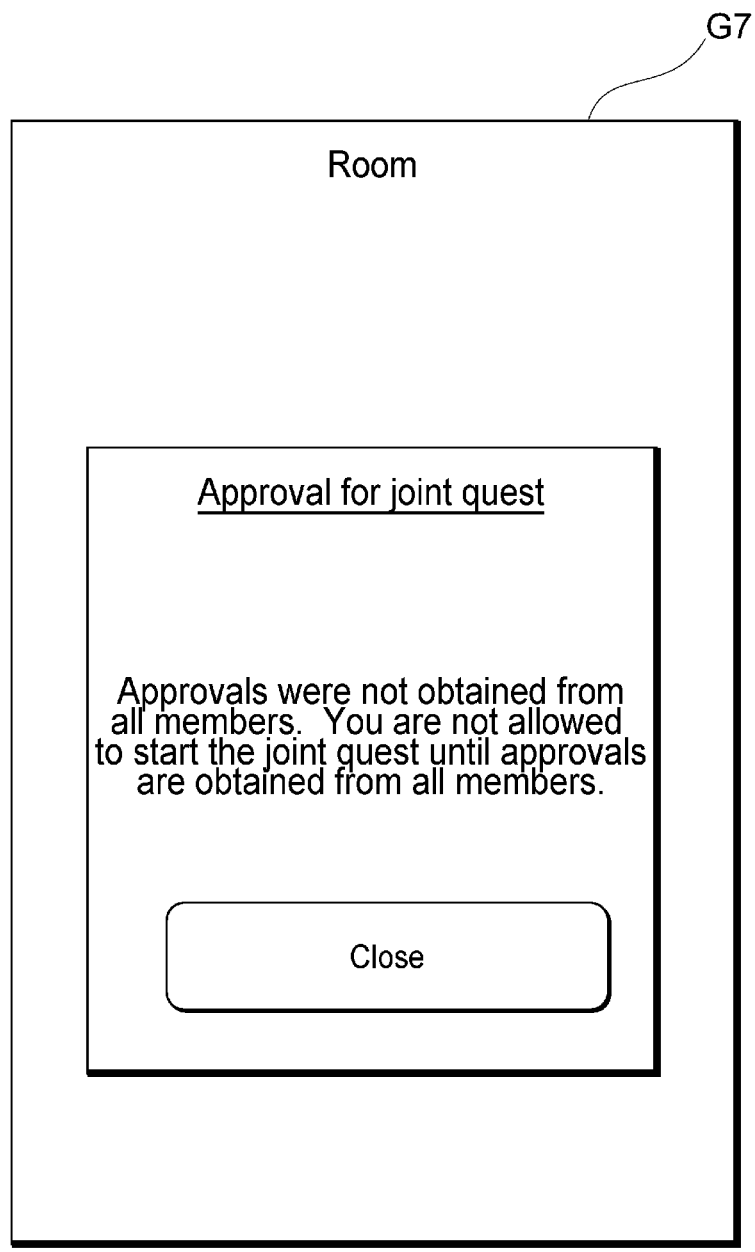
FIG. 13 shows an example of the screen of the output unit of the player terminal according to the embodiment of the present invention.

FIG. 13 shows an example of a reply result screen that is output from the output unit 37 of the player terminal 3a of player 1. For example, when replies permitting the execution of joint event 1 could not be accepted from all of players 2 to 20 (when approvals could not be obtained from all of players 2 to 20), it is not possible to start the execution of joint event 1. In this case, as shown in FIG. 13, the output unit of the player terminal 3a of player 1 outputs a reply result screen G7 including a message indicating that it is not possible to execute joint event 1.

(Step S35)

The reward providing unit 123 provides a reward to each of players 1 to 20 participating in joint event 1 in accordance with the status progress of joint event 1. For example, the reward providing unit 123 determines whether there has been a success in joint event 1, and the process proceeds to step S37 in the case where it is determined that there has been a success (e.g., defeating an enemy character in the event). In the case where it is determined that there has not been a success, no reward is provided, and the process proceeds to step S39. The configuration may be such that a penalty is given, for example, so as to consume a player parameter or the like in addition to not providing a reward or instead of not providing a reward in the case where there has not been a success.

(Step S37)

In the case where there has been a success in joint event 1, the reward providing unit 123 provides a reward for each player participating in the joint event. Furthermore, the reward providing unit 123 stores, in the storage unit 18, whether or not there has been a success in each of joint events that are executed iteratively.

(Step S39)

The joint-event number-of-times checking unit 125 checks whether or not the number of times for execution of the joint event has reached the upper-limit number of times each time the joint event is finished. For example, the joint-event number-of-times checking unit 125 determines whether or not the number of times for execution of the joint event has reached 20, which is the upper-limit number of times. Since the current number of times of execution in this embodiment is one, the number of times of execution has not reached the upper-limit number of times, and thus the process proceeds to step S43.

(Step S41)

For example, in the case where it is determined that the number of times for execution has reached 20, the joint-event number-of-times checking unit 125 determines that all of joint events 1 to 20 have been finished, and the process is finished.

(Step S43)

In the case where the number of times for execution of the joint event is less than the number of times for successive execution (upper-limit number of times), the privilege management unit 119 shown in FIG. 3 grants an execution privilege to a player other than players who was granted an execution privilege in the past. That is, the privilege management unit 119 deprives the player who has been granted an execution privilege of that execution privilege and newly grants an execution privilege to another player. For example, when the number of times for execution of the joint event is 1 (one time for the termination of joint event 1), the privilege management unit 119 grants an execution privilege to one of players 2 to 20 other than player 1, who has been granted the execution privilege for joint event 1. The privilege management unit 119 notifies the player terminal 3b of player 2 that player 2 has been granted the execution privilege for the next joint event 2.

(Step S45)

The player terminal 3b of player 2, who has been granted the execution privilege for joint event 2 by the privilege management unit 119, sends an execution instruction for joint event 2 to the information processing server 1. The subsequent steps are the same as step S25 and the subsequent steps described above. In this way, steps S21 to S45 described above are executed iteratively until the last joint event 20 is finished.

In this embodiment, for convenience, it has been assumed that the number of participating players is 20 and that the upper-limit number of times for execution of a joint event is the same as the number of participating players. Here, a description will also be given for a case where the number of players participating in a joint event is less than the upper-limit number of times for execution of the joint event. In the case where the number of players participating in a joint event is less than the upper-limit number of times for execution of the joint event and the joint event has been finished for a number of times for execution corresponding to the number of players participating in the joint event, although the upper-limit number of times for execution of the joint event has not been reached, all the participating players are players who were granted an execution privilege in the past. That is, all the players have individually been granted execution privileges for joint events, and all those joint events have been finished. In this case, the privilege management unit 119 deprives a player who has been granted an execution privilege immediately before of that execution privilege; however, the privilege management unit 119 does not newly grant an execution privilege until another player further participates, and newly grants an execution privilege to another player when that player additionally participates in a joint event.

Furthermore, as another embodiment, in the case where it is determined that the privilege management unit 119 has granted execution privileges to all the players who were granted an execution privilege in the past while the number of times for execution of finished joint events is less than the initially set upper-limit number of times for execution of joint events, the successive execution of joint events may be finished instead of iteratively executing joint events further.

Furthermore, when a quit control signal (second control signal) for quitting iterative execution of joint events is accepted from the player terminal 3 of one player among the plurality of players 1 to 20 permitted to participate in the joint event, while the above-described processing for approving of the execution of the joint event has not been executed, the joint-event execution control unit 121 shown in FIG. 3 sends a query as to whether or not to quit iterative execution of joint events to all the players other than the one player, and quits iterative execution of joint events when the replies from all the players other than the one player satisfy a predetermined condition (e.g., replies that permit quitting are received from a majority of the queried players).

Figure 14:
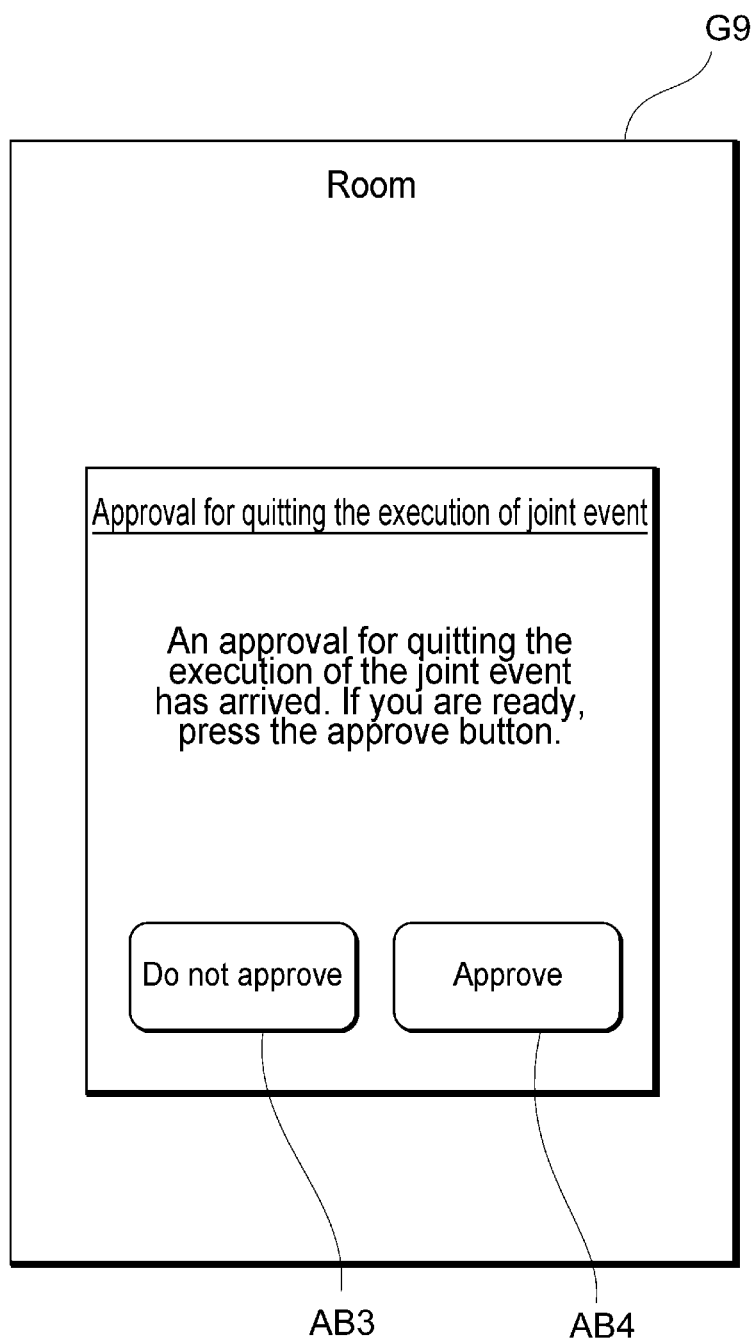
FIG. 14 shows an example of the screen of the output unit of the player terminal according to the embodiment of the present invention.

FIG. 14 shows an example of an approval screen G9 that is output from the output unit 37 of each player terminal 3 that has received a query as to whether or not to permit quitting iterative execution of a joint event. As shown in FIG. 14, when the player presses an approval button AB4 for approving quitting iterative execution of the joint event in the approval screen G9, quitting of iterative execution of the joint event is approved. Meanwhile, when the player presses a non-approval button AB3 for not approving quitting iterative execution of the joint event in the approval screen G9, quitting of iterative execution of joint event 1 is not approved.

When iterative execution of the joint event is quit as a result of querying each player, the joint-event execution control unit 121 executes processing for quitting the joint event. Furthermore, together with the processing for quitting, the joint-event execution control unit 121 checks whether there has been a success in each joint event, stored in the storage unit 18, and in the case where there has been no success among all the joint events, restores the first parameter or second parameter consumed while participating in iterative execution of joint events to all the participating players. That is, in the case where iterative execution of joint events has been quit without any success in the joint events, the stamina and items consumed by the players while participating in the processing for iterative execution of joint events are restored. Thus, even if joint events are executed in a situation where it is impossible for players to succeed in the joint events (e.g., a situation where the players do not have sufficient skills in the game), if the players determine that it was reckless to execute joint events and quit iterative execution of joint events, the parameters consumed while participating in the joint events are restored.

As another example, the parameter that is restored for each player when iterative execution of joint events is quit may be obtained on the basis of the number of successes, the success rate, etc. of joint events iteratively executed so far.

Furthermore, in the case where a participation prohibiting control signal (third control signal) for prohibiting participation by a player other than one player among the plurality of players 1 to 20 permitted to participate in a joint event has been accepted from the player terminal 3 of said one player, while the above-described processing for approving the execution of joint events has not been executed, the joint-event participation management unit 117 shown in FIG. 3 may send a query as to whether or not to prohibit participation in joint events to all the players other than the one player and the player 5 for whom participation is to be prohibited, and may prohibit the target player from participating in the joint event when the replies from all the players except the one player and the target player 5 satisfy a predetermined condition (e.g., replies for prohibiting participation have been received from a majority of the queried players).

Figure 15:
FIG. 15 shows an example of the screen of the output unit of the player terminal according to the embodiment of the present invention.

FIG. 15 shows an example of an approval screen G11 that is output from the output unit 37 of each player terminal 3 queried as to whether or not to prohibit participation of a player in a joint event. As shown in FIG. 15, when the player presses an approval button AB6 for approving prohibiting player 5 from participating in a joint event in the approval screen G11, prohibition of participation of player 5 in the joint event is approved. Meanwhile, when the player presses a non-approval button AB5 for not approving prohibiting player 5 from participating in the joint event, prohibition of participation of player 5 in the joint event 1 is not approved.

According to the above-described embodiments of the present invention, control is executed such that players who participate in an already generated joint event also pay for participation in the joint event, similarly to a player who generates the joint event. Furthermore, by limiting the upper-limit number of participating players to the upper-limit number of times of joint events, it is possible to execute joint events a number of times corresponding to the number of participating players. As described above, it is possible to provide a game with which the motivation of players to participate in the game and to continue the game can be enhanced by ensuring fairness among the players.

The privilege management unit 119 grants an execution privilege to a player other than a player or players who were granted an execution privilege in the past in the case where the number of times for the execution of joints events is less than the number of times for successive execution.

With this configuration, it is possible to smoothly grant an execution privilege to a player who has not yet been granted an execution privilege for a joint event.

In the case where a second control signal for prohibiting the execution of a joint event has been accepted from the terminal of one player among a plurality of players permitted to participate in the joint event, the joint-event execution control unit 121 sends a query as to whether or not to prohibit the execution of the joint event to all the players other than the one player, and prohibits the execution of the joint event when the results of replies from all the players other than the one player satisfy a predetermined condition.

With this configuration, in the case where a plurality of successive joint events are generated, even if a certain player attempts to forcibly quit the joint events, it is not possible to quit the joint events unless approvals from the other players are obtained. This serves to prevent joint events from arbitrarily being quit unexpectedly for the players.

In the case where a third control signal has been accepted from the terminal of one player among a plurality of players permitted to participate in a joint event, the third control signal being a signal for prohibiting participation by a player other than the one player, the joint-event participation management unit 117 sends a query as to whether to prohibit participation in the joint event to all the players except the one player and the target player for prohibiting participation, and prohibits the target player from participating in the joint event when the results of replies from all the players except the one player and the target player satisfy a predetermined condition.

With this configuration, even in the case where a player wishes to forcibly prohibit a player from participating in a joint event, i.e., even in the case where a player wishes to exclude a player from the participating members, it is not possible to exclude the player from the participating members without having to obtain approvals from individual players. Thus, it is possible to prevent a situation in which another player is arbitrarily excluded from the participating members at the discretion of a specific player.

It is to be noted that the above-described embodiments are presented to facilitate the understanding of the present invention and should not be construed to limit the present invention. The present invention can be modified or improved without departing from the gist thereof, and the present invention encompasses equivalents thereof.

REFERENCE SIGNS LIST

1 Information processing server
2 Player terminal
11 (31) CPU
13 (33) Memory
14 (34) Bus
15 (35) Input/output interface
16 (36) Input unit
17 (37) Output unit
18 (38) Storage unit
19 (39) Communication unit
111, 311 Information processing unit
113 Joint-event generation management unit
115 Number-of-players determination unit
117 Joint-event participation management unit
119 Privilege management unit
121 Joint-event execution control unit
123 Reward providing unit
125 Joint-event number-of-times checking unit
313 Game running unit
315 Reply-screen generation unit

The invention claimed is:

1. An information processing program comprising instructions that, when executed by a computer, cause the computer to:
consume a first parameter associated with a first player upon accepting a first control signal for generating a joint event in which a plurality of players jointly participate from a first terminal of the first player among the plurality of players, the first control signal including an upper-limit number of times that the joint event can be executed successively;
generate the joint event, while considering the first player as a participant, in response to determining, based on the first parameter, that generating the joint event is possible;
determine, based on the upper-limit number of times, an upper-limit number of players allowed to participate in the joint event;
upon accepting a request for wishing to participate in the joint event from a second terminal of a player other than the first player, consume a second parameter associated with the other player;
permit the other player to participate in the joint event in response to determining, based on the second parameter and the determined upper-limit number of players, that the other player is allowed to participate in the joint event;
grant an execution privilege for the joint event to one player among a plurality of players permitted to participate in the joint event;
in response to an execution instruction for the joint event being accepted from a third terminal of the player who has been granted the execution privilege, send a query as to whether or not to permit the execution of the joint event to all the players except the player who has been granted the execution privilege among the plurality of players permitted to participate in the joint event; and
start the execution of the joint event when replies permitting the execution of the joint event have been accepted from all those players;
provide a reward to each player participating in the joint event in accordance with the progress status of the joint event; and
check whether or not the number of times for the execution of the joint event has reached the upper-limit number of times each time the joint event is finished.

2. The information processing program according to claim 1, wherein the instructions further cause the computer to grant the execution privilege to a second player not granted the execution privilege in the past in response to the number of times for the execution of the joint event being less than the upper-limit number of times and the joint event has been finished.

3. The information processing program according to claim 1, wherein the instructions further cause the computer to, in response to a second control signal for quitting repeated execution of the joint event being accepted from a fourth terminal of one player among a plurality of players permitted to participate in the joint event, send a query as to whether or not to quit repeated execution of the joint event to all the players other than the one player, and quit repeated execution of the joint event when the results of replies from all the players other than the one player satisfy a predetermined condition.

4. The information processing program according to claim 1, wherein the instructions further cause the computer to, in response to a third control signal being accepted from a fourth terminal of one of a plurality of players permitted to participate in the joint event, the third control signal being a signal for prohibiting participation by a second player other than said one player, send a query as to whether or not to prohibit participation in the joint event to all the players other than said one player and the target player for prohibiting participation, and prohibit the target player from participating in the joint event when the results of replies from all the players other than said one player and the target player satisfy a predetermined condition.

5. An information processing server comprising:
a computer processor; and
a memory coupled to the computer processor, the memory being configured to:
consume a first parameter associated with the first player, upon accepting a first control signal for generating a joint event in which a plurality of players jointly participate from a terminal of a first player among the plurality of players, the first control signal including an upper-limit number of times that the joint event can be executed successively; and
generate the joint event, while considering the first player as a participant, in response to determining, based on the first parameter, that generating the joint event is possible;
determine, based on the upper-limit number of times, an upper-limit number of players allowed to participate in the joint event;
upon accepting a request for wishing to participate in the joint event from a terminal of a player other than the first player, consume a second parameter associated with the other player;
permit the other player to participate in the joint event in response to determining, based on the second parameter and the determined upper-limit number of players, that the other player is allowed to participate in the joint event;
grant an execution privilege for the joint event to one player among a plurality of players permitted to participate in the joint event;

in response to an execution instruction for the joint event being accepted from the terminal of the player who has been granted the execution privilege, send a query as to whether or not to permit the execution of the joint event to all the players except the player who has been granted the execution privilege among the plurality of players permitted to participate in the joint event, and start the execution of the joint event when replies permitting the execution of the joint event have been accepted from all those players;

provide a reward to each player participating in the joint event in accordance with the progress status of the joint event; and check whether or not the number of times for the execution of the joint event has reached the upper-limit number of times each time the joint event is finished.

6. An information processing system comprising:

a plurality of terminals individually used by a plurality of players; and an information processing server communicatively connected to the plurality of terminals, wherein each of the plurality of terminals is configured to:
   generate, using a display, a reply screen for accepting a reply to a query from the information processing server, and
   accept the reply via the reply screen, and wherein the information processing server is configured to:

consume a first parameter associated with the first player, upon accepting a first control signal for generating a joint event in which a plurality of players jointly participate from a terminal of a first player among the plurality of players, the first control signal including an upper-limit number of times that the joint event can be executed successively, generate the joint event, while considering the first player as a participant, in response to determining, based on the first parameter, that generating the joint event is possible, determine, based on the upper-limit number of times, an upper-limit number of players allowed to participate in the joint event, upon accepting a request for wishing to participate in the joint event from a terminal of a player other than the first player, consumes a second parameter associated with the other player, permit the other player to participate in the joint event in response to determining, based on the second parameter and the determined upper-limit number of players, that the other player is allowed to participate in the joint event, grant an execution privilege for the joint event to one player among a plurality of players permitted to participate in the joint event, in response to an execution instruction for the joint event being accepted from the terminal of the player who has been granted the execution privilege, send a query as to whether or not to permit the execution of the joint event to all the players except the player who has been granted the execution privilege among the plurality of players permitted to participate in the joint event, start the execution of the joint event when replies permitting the execution of the joint event have been accepted from all those players, provide a reward to each player participating in the joint event in accordance with the progress status of the joint event, and check whether or not the number of times for the execution of the joint event has reached the upper-limit number of times each time the joint event is finished.

\* \* \* \* \*